(12) United States Patent
Liu et al.

(10) Patent No.: US 12,014,872 B2
(45) Date of Patent: Jun. 18, 2024

(54) HYBRID ELECTRODES AND ELECTROCHEMICAL CELLS AND MODULES UTILIZING THE SAME

(71) Applicant: GM GLOBAL TECHNOLOGY OPERATIONS LLC, Detroit, MI (US)

(72) Inventors: Haijing Liu, Yangpu (CN); Xiaochao Que, Shanghai (CN); Dewen Kong, Shanghai (CN); Jianfeng Wang, Jiangsu (CN)

(73) Assignee: GM Global Technology Operations LLC, Detroit, MI (US)

( * ) Notice: Subject to any disclaimer, the term of this patent is extended or adjusted under 35 U.S.C. 154(b) by 867 days.

(21) Appl. No.: 17/050,084

(22) PCT Filed: Apr. 23, 2018

(86) PCT No.: PCT/CN2018/084085
§ 371 (c)(1),
(2) Date: Oct. 23, 2020

(87) PCT Pub. No.: WO2019/204964
PCT Pub. Date: Oct. 31, 2019

(65) Prior Publication Data
US 2021/0065993 A1    Mar. 4, 2021

(51) Int. Cl.
*H01G 11/06*    (2013.01)
*H01G 11/24*    (2013.01)
(Continued)

(52) U.S. Cl.
CPC ............. *H01G 11/06* (2013.01); *H01G 11/24* (2013.01); *H01G 11/28* (2013.01); *H01G 11/46* (2013.01);
(Continued)

(58) Field of Classification Search
CPC ........ H01G 11/06; H01G 11/24; H01G 11/28; H01G 11/46; H01G 11/50; H01M 4/48;
(Continued)

(56) References Cited

U.S. PATENT DOCUMENTS

| 5,744,258 A * | 4/1998 | Bai ...................... H01M 4/366 429/231.5 |
| 10,297,885 B2 | 5/2019 | Gayden et al. |

(Continued)

FOREIGN PATENT DOCUMENTS

| CN | 105190811 A | 12/2015 |
| CN | 106207264 A | 12/2016 |

(Continued)

OTHER PUBLICATIONS

International Search Report and the Written Opinion of the International Searching Authority for application No. PCT/CN2018/084085 dated Feb. 14, 2019, 9 pages.

*Primary Examiner* — Christopher P Domone
*Assistant Examiner* — Kimberly Wyluda
(74) *Attorney, Agent, or Firm* — Quinn IP Law (57) ABSTRACT

Hybrid electrochemical cells and modules include an anode two-sided current collector a coated with host material in anode region(s) and a cathode two-sided current collector coated with active material in cathode region(s), and one or more of the anode current collector and the cathode current collector is coated with capacitor material in one or more distinct, non-overlapping capacitor regions. A hybrid anode and/or cathode can include gaps between capacitor regions and anode regions and cathode regions. The capacitor material applied to an electrode is different from the host or active material thereof. Active material includes lithium metal oxides and lithium metal phosphates such as $LiFePO_4$, $Li(Ni_xMn_yCo_z)O_2$, and/or $LiMn_2O_4$; host material includes graphite, silicon, silicon-Li/Sn/Cu alloys, Si/Co/Fe/TiSn
(Continued)

oxides, and low-surface area carbon; and capacitor material includes activated carbon, metal oxides, and metal sulfides.

20 Claims, 4 Drawing Sheets

(51) Int. Cl.
*H01G 11/28* (2013.01)
*H01G 11/46* (2013.01)
*H01G 11/50* (2013.01)
*H01M 4/02* (2006.01)
*H01M 4/48* (2010.01)
*H01M 10/0525* (2010.01)
*H01M 10/0587* (2010.01)
*H01M 12/00* (2006.01)

(52) U.S. Cl.
CPC .............. *H01G 11/50* (2013.01); *H01M 4/48* (2013.01); *H01M 10/0525* (2013.01); *H01M 10/0587* (2013.01); *H01M 12/00* (2013.01); *H01M 2004/027* (2013.01); *H01M 2004/028* (2013.01)

(58) Field of Classification Search
CPC ......... H01M 10/0525; H01M 10/0587; H01M 12/00; H01M 2004/027; H01M 2004/028
See application file for complete search history.

(56) References Cited

U.S. PATENT DOCUMENTS

| | | |
|---|---|---|
| 10,597,783 B2 | 3/2020 | Liu et al. |
| 10,637,040 B2 | 4/2020 | Zhang et al. |
| 10,693,176 B2 | 6/2020 | Liu et al. |
| 2005/0081370 A1* | 4/2005 | Kurihara ................ H01G 11/52 29/623.5 |
| 2013/0171502 A1 | 7/2013 | Chen et al. |
| 2015/0280226 A1* | 10/2015 | Teraki ................ H01M 4/0419 118/314 |
| 2016/0285137 A1* | 9/2016 | Gayden ............... H01M 50/105 |
| 2019/0061555 A1 | 2/2019 | Liu et al. |
| 2019/0067754 A1 | 2/2019 | Gu et al. |
| 2019/0157659 A1 | 5/2019 | Liu et al. |
| 2020/0118770 A1 | 4/2020 | Liu et al. |
| 2020/0173028 A1 | 6/2020 | Liu et al. |
| 2020/0321648 A1 | 10/2020 | Liu et al. |

FOREIGN PATENT DOCUMENTS

| | | |
|---|---|---|
| JP | 2008244210 A | 10/2008 |
| JP | 2012043753 A | 3/2012 |

* cited by examiner

HYBRID ELECTRODES AND ELECTROCHEMICAL CELLS AND MODULES UTILIZING THE SAME

CROSS-REFERENCE TO RELATED APPLICATIONS

This application claims the benefit of PCT/CN2018/084085 filed Apr. 23, 2018, which is incorporated herein by reference in its entirety.

INTRODUCTION

Lithium ion batteries describe a class of rechargeable batteries in which lithium ions move between a negative electrode (i.e., anode) and a positive electrode (i.e., cathode). Liquid and polymer electrolytes can facilitate the movement of lithium ions between the anode and cathode. Lithium-ion batteries are growing in popularity for defense, automotive, and aerospace applications due to their high energy density and ability to undergo successive charge and discharge cycles.

SUMMARY

A hybrid electrochemical cell is provided and includes an anode including a two-sided current collector, wherein each side of the current collector can be coated in one or more anode regions with an anode host material and in one or more capacitor regions with a capacitor material, and a cathode including a two-sided current collector, wherein each side of the current collector can be coated in one or more cathode regions with a cathode active material and in one or more capacitor regions with a capacitor material. The one or more capacitor regions of the anode can be distinct from and not overlap the one or more anode regions, and/or the one or more capacitor regions of the cathode can be distinct from and not overlap the one or more cathode regions. The anode can include gaps between the one or more capacitor regions and the one or more anode regions, and/or the cathode can include gaps between the one or more capacitor regions and the one or more cathode regions. The capacitor material can be one or more of activated carbon, graphite, carbon aerogel, carbide-derived carbon, graphene, graphene oxide, carbon nanotubes, lead oxide, germanium oxide, cobalt oxide, nickel oxide, copper oxide, iron oxide, manganese oxide, ruthenium oxide, rhodium oxide, palladium oxide, chromium oxide, molybdenum oxide, tungsten oxide, niobium oxide, $TiS_2$, NiS, $Ag_4Hf_3S_8$, CuS, FeS, and $FeS_2$. The capacitor material applied to the anode current collector can be different from the anode host material, the capacitor material applied to the cathode current collector can be different from the cathode active material. The anode host material can include one or more of lithium titanate, $TiNb_2O_7$, silicon, one or more silicon-lithium alloys, one or more silicon-tin alloys, one or more silicon-copper alloys, one or more silicon oxides, one or more cobalt oxides, one or more iron oxides, one or more titanium oxides, tin, one or more tin oxides, hard carbon, soft carbon, and graphite. The cathode active material can include one or more lithium metal oxides. The cathode active material can include one or more of lithium iron phosphate, lithium nickel-manganese-cobalt oxide, and spinel-structured lithium manganese oxide, the anode host material can include one or more of graphite, silicon and one or more silicon oxides, and the capacitor material can include activated carbon.

A hybrid electrochemical cell is provided and includes an anode including a two-sided anode current collector, wherein each side of the anode current collector can be at least partially coated with an anode host material, and a cathode including a two-sided current collector, wherein each side of the current collector can be at least partially coated with a cathode active material. The anode current collector and/or the cathode current collector can be coated with capacitor material in one or more capacitor regions. Each of the anode current collector and the cathode current collector can be coated with capacitor material in one or more capacitor regions. The capacitor material coated on the cathode current collector can include one or more of activated carbon, graphite, carbon aerogel, carbide-derived carbon, graphene, graphene oxide, carbon nanotubes, lead oxide, germanium oxide, cobalt oxide, nickel oxide, copper oxide, iron oxide, manganese oxide, ruthenium oxide, rhodium oxide, palladium oxide, chromium oxide, molybdenum oxide, tungsten oxide, niobium oxide, $TiS_2$, NiS, $Ag_4Hf_3S_8$, CuS, FeS, $FeS_2$, poly (3-methyl thiophene), polyaniline, polypyrrole, poly(paraphenylene), polyacene, polythiophene, and polyacetylene. The cathode active material can include one or more of lithium iron phosphate, lithium nickel-manganese-cobalt oxide, and spinel-structured lithium manganese oxide, the anode host material can include one or more of graphite, silicon and one or more silicon oxides, and the capacitor material can include activated carbon. The anode host material can include one or more of lithium titanate, $TiNb_2O_7$, silicon, one or more silicon-lithium alloys, one or more silicon-tin alloys, one or more silicon-copper alloys, one or more silicon oxides, one or more cobalt oxides, one or more iron oxides, one or more titanium oxides, tin, one or more tin oxides, hard carbon, soft carbon, and graphite. The cathode active material can include one or more lithium metal oxides.

A hybrid electrochemical module is provided and includes a plurality of stacked or wound electrode pairs. Each electrode pair includes an anode including a two-sided anode current collector, wherein each side of the anode current collector can be at least partially coated with an anode host material, and a cathode including a two-sided current collector, wherein each side of the current collector can be at least partially coated with a cathode active material. The anode current collector and/or the cathode current collector of each electrode pair can be coated with capacitor material in one or more capacitor regions. The capacitor material can include one or more of activated carbon, graphite, carbon aerogel, carbide-derived carbon, graphene, graphene oxide, carbon nanotubes, lead oxide, germanium oxide, cobalt oxide, nickel oxide, copper oxide, iron oxide, manganese oxide, ruthenium oxide, rhodium oxide, palladium oxide, chromium oxide, molybdenum oxide, tungsten oxide, niobium oxide, $TiS_2$, NiS, $Ag_4Hf_3S_8$, CuS, FeS, and $FeS_2$. The thickness of the capacitor material, and the anode host material and/or the cathode host material can be about 20 micrometers to about 200 micrometers. The width of the one or more anode regions and/or the one or more cathode regions can be about 25 millimeters to about 500 millimeters, and the width of the one or more capacitor regions can be about 5 millimeters to about 400 millimeters. The anode current collector and the cathode current collector of each electrode pair can be coated with capacitor material in one or more capacitor regions. The cathode active material can include one or more of lithium iron phosphate, lithium nickel-manganese-cobalt oxide, and spinel-structured lithium manganese oxide, the anode host material can include one or more of graphite, silicon and one or more silicon oxides, and the capacitor material can include activated carbon.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are hybrid electrochemical cells which utilize one or more hybrid electrodes comprising anode and/or cathode materials for lithium-ion batteries in varying combinations with compatible capacitor materials. The hybrid electrochemical cells exhibit beneficial properties of both lithium-ion batteries and capacitors, such as enhanced energy densities (Wh/kg) and power densities (W/kg). The energy density and power density characteristics of a given hybrid cell can vary depending on the quantity, composition, and ratio of battery electrode materials and capacitor electrode materials applied to the plurality of hybrid cell electrodes. In general, energy density is improved by increasing battery material content and/or by selecting high specific energy battery electrode materials while the power density of the hybrid electrochemical cell is increased by increasing the content of capacitor electrode material and/or by selecting high specific power density capacitor compositions.

Figure 1:
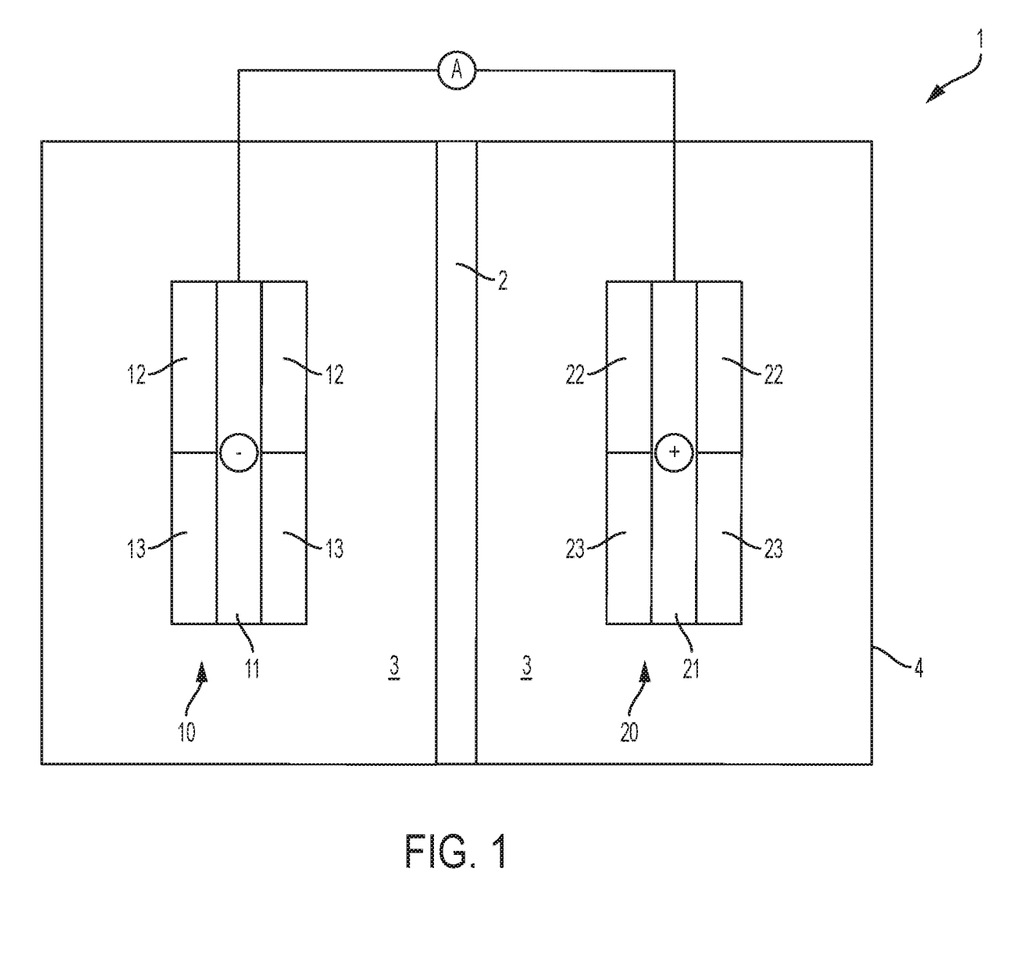
FIG. 1 illustrates a hybrid electrochemical cell, according to one or more embodiments.

FIG. 1 illustrates a hybrid electrochemical cell 1 comprising a negative electrode (i.e., the anode) 10, a positive electrode (i.e., the cathode) 20, an electrolyte 3 operatively disposed between the anode 10 and the cathode 20, and a separator 2. Anode 10, cathode 20, and electrolyte 3 can be encapsulated in container 4, which can be a hard (e.g., metallic) case or soft (e.g., polymer) pouch, for example. The anode 10 and cathode 20 are situated on opposite sides of separator 2 which can comprise a microporous polymer or other suitable material capable of conducting lithium ions and optionally electrolyte 3 (i.e., liquid electrolyte).

Hybrid electrochemical cell 1 generally operates by reversibly passing lithium ions between anode 10 and cathode 20. Lithium ions move from cathode 20 to anode 10 while charging, and move from anode 10 to cathode 20 while discharging. At the beginning of a discharge, anode 10 contains a high concentration of intercalated lithium ions while cathode 20 is relatively depleted, and establishing a closed external circuit between anode 10 and cathode 20 under such circumstances causes intercalated lithium ions to be extracted from anode 10. The extracted lithium atoms are split into lithium ions and electrons as they leave an intercalation host at an electrode-electrolyte interface. The lithium ions are carried through the micropores of separator 2 from anode 10 to cathode 20 by the ionically conductive electrolyte 3 while, at the same time, the electrons are transmitted through the external circuit from anode 10 to cathode 20 to balance the overall electrochemical cell. This flow of electrons through the external circuit can be harnessed and fed to a load device until the level of intercalated lithium in the negative electrode falls below a workable level or the need for power ceases. The arrows indicate that current is flowing out of anode 10 and that current is flowing into cathode 20, and thus hybrid cell 10 is shown in a charging state.

Hybrid electrochemical cell 1 may be recharged after a partial or full discharge of its available capacity. To charge or re-power the hybrid electrochemical cell 1, an external power source (not shown) is connected to the positive and the negative electrodes to drive the reverse of hybrid electrochemical cell 1 discharge electrochemical reactions. That is, during charging, the external power source extracts the lithium ions present in cathode 20 to produce lithium ions and electrons. The lithium ions are carried back through the separator 2 by the electrolyte 3, and the electrons are driven back through the external circuit A, both towards anode 10. The lithium ions and electrons are ultimately reunited at the anode 10, thus replenishing it with intercalated lithium for future cell discharge.

Hybrid electrochemical cell 1, or a module or pack comprising a plurality of hybrid electrochemical cells 1 connected in series and/or in parallel, can be utilized to reversibly supply power and energy to an associated load device. Hybrid electrochemical cells may also be used in various consumer electronic devices (e.g., laptop computers, cameras, and cellular/smart phones), military electronics (e.g., radios, mine detectors, and thermal weapons), aircrafts, and satellites, among others. Hybrid electrochemical cells, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the hybrid electrochemical cells, modules, and packs may be used in combination with a gasoline or diesel internal combustion engine to propel the vehicle (such as in hybrid electric vehicles), or may be used alone to propel the vehicle (such as in battery-powered vehicles).

Anode 10 includes a two-sided current collector 11 and cathode 20 includes a two-sided current collector 21. Current collectors 11 and 21 are generally formed from thin metallic foils, of varying sizes and geometries. The current collectors 11 and 21 associated with the two electrodes 10 and 20 are connected by an external circuit A that allows an electric current to pass between the electrodes to electrically balance the related migration of lithium ions. The anode current collector 11 can comprise copper, aluminum, stainless steel, clad foil, or any other appropriate electrically conductive material known to skilled artisans. The cathode current collector 21 can comprise aluminum, stainless steel or any other appropriate electrically conductive material known to skilled artisans, and can be formed in a foil or grid shape. Current collectors 11 and 21 may have a thickness of about 4 micrometers to about 25 micrometers, in some embodiments.

The anode current collector 11 has a lithium intercalation host material 13 applied to each side thereof in one or more anode regions, and the cathode current collector 21 has a lithium-based active material 23 applied to each side thereof in one or more cathode regions. The active material 23 can store lithium ions at a higher electric potential than the intercalation host material 13. At least one of the anode 10 and the cathode 20 is a hybrid electrode and further includes a capacitor material 12 and 22, respectively, applied to each side of its respective current collector 11 and 21 in one or more capacitor regions. Accordingly, hybrid electrochemical cell 1 may comprise a hybrid anode 10, a hybrid cathode 20, or a hybrid anode 10 and a hybrid cathode 20. For a given hybrid anode 10, the capacitor material 12 applied to the anode current collector 11 is different from the anode host material 13. Similarly, for a given hybrid cathode 20, the capacitor material 22 applied to the cathode current collector 21 is different from the cathode active material 23. In general, current collectors 11 and 21 are coated on both sides with porous layers of individual electrode materials (host material 13, active material 23, and capacitor material 12 and 22) in respective, distinct, non- overlapping regions. In some embodiments, the anode 10 and/or the cathode 20 comprise gaps between the anode region(s) or cathode region(s) and the capacitor region(s) of the current collector 11 or 21, respectively. Such gaps comprise uncoated (i.e., bare) regions of the current collector 11 or 21 which accommodate for expansion of host material 13, active material 23, and capacitor material 12 and 22 which may occur during hybrid cell charging and discharging. The thicknesses of the coating layers can be varied to tune the capacity of the layer to accept and release lithium ions and anions of the lithium electrolyte solution. The thicknesses of the coatings are not necessarily the same on each side of the current collector.

Host material 13 can include any lithium host material that can sufficiently undergo lithium ion intercalation, deintercalation, and alloying, while functioning as the negative terminal of the hybrid electrochemical cell 1. In one embodiment, the host material 13 comprises lithium titanate. In some embodiments, the host material 13 comprises lithium titanate ("LTO"), silicon, silicon-lithium alloys, silicon-tin alloys, silicon-copper alloys, silicon oxide, tin, tin oxides, cobalt oxides, iron oxides, titanium oxides (e.g., $TiO_2$), TiNb2O7, and low-surface area carbon material including hard carbon, soft carbon, and graphite. During cell-discharge, electrons are released from the host material 13 into the electrical power-requiring external circuit A and lithium ions are released (de-intercalated) into an anhydrous lithium ion conducting electrolyte 3. A small amount of conductivity enhancing carbon particles may be mixed with the host material 13, in some embodiments.

Active material 23 can include any lithium-based active material that can sufficiently undergo lithium intercalation and deintercalation while functioning as the positive terminal of the hybrid electrochemical cell 1. In one embodiment, the active material 23 comprises lithium manganese oxide. In some embodiments, the active material 23 comprises lithium-metal-oxides and lithium metal phosphates, which include, but are not limited to, lithium manganese oxide, lithium nickel oxide, lithium cobalt oxide, lithium nickel manganese cobalt oxide, or lithium iron phosphates. Specific lithium metal oxides include lithium aluminum manganese oxide (e.g., $Li_xAl_yMn_{1-y}O_2$) and lithium transitional metal oxides such as spinel-structured lithium manganese oxide $LiMn_2O_4$ ("LMO"), lithium cobalt oxide (e.g., $LiCoO_2$), lithium nickel-manganese-cobalt oxide (e.g., $Li(Ni_xMn_y Co_z)O_2$, wherein x+y+z=1) ("NMC"), lithium nickel oxide (e.g., $LiNiO_2$), lithium vanadium oxide (e.g., $LiV_2O_5$), or a lithium iron polyanion oxide such as lithium iron phosphate $LiFePO_4$ ("LFP") or lithium iron fluorophosphate ($Li_2FePO_4F$). Active material 23 can also include a polymer binder material to structurally hold the lithium-based active material together.

Capacitor material 12 and/or 22 comprises high-surface area carbon materials, or activated carbon materials ("AC"), in some embodiments. In some embodiments, the capacitor material 12 and/or 22 comprises AC, graphite, carbon aerogel, carbide-derived carbon, graphene, graphene oxide, carbon nanotubes, oxides of lead, germanium, cobalt, nickel, copper, iron, manganese, ruthenium, rhodium, palladium, chromium, molybdenum, tungsten, or niobium, metal sulfides (e.g., $TiS_2$, NiS, $Ag_4Hf_3S_8$, CuS, FeS, or $FeS_2$). AC can comprise AC particles or AC fibers, for example. In some embodiments, capacitor material 22 can comprise any of the above materials and additionally or alternatively one or more of poly (3-methyl thiophene), polyaniline, polypyrrole, poly(paraphenylene), polyacene, polythiophene, and polyacetylene. Carbonaceous capacitor materials 12 and/or 22 are surface modified to provide high material surface areas. For example, in the case of graphite, an anode host material 13 can comprise low surface area graphite which supports intercalation/deintercalation of lithium ions (via chemical mechanisms), whereas a capacitor material 12 and/or 22 can comprise high surface area graphite which supports adsorption/desorption of anions or cations (via physical mechanisms). The foregoing graphite comparison is similarly applicable to the other carbonaceous anode host materials 13 and capacitor materials 12 and/or 22 described herein. In some embodiments, cathode active material 23 can comprise a surface area of about 0.2 m²/gram to about 30 m²/gram. In some embodiments, anode host material 13 can comprise a surface area of about 0.5 m²/gram to about 50 m²/gram. In some embodiments, capacitor materials 12 and/or 22 can comprise a surface of about 1,000 m²/gram to about 3,000 m²/gram.

In one embodiment, the cathode 20 comprises LFP active material 23 and AC capacitor material 22 applied to one or both sides of the cathode current collector 21, and the anode 10 comprises graphite host material 13 applied to one or both sides of the anode current collector 11. In one embodiment, the cathode 20 comprises NMC active material 23 and AC capacitor material 22 applied to one or both sides of the cathode current collector 21, and the anode 10 comprises graphite host material 13 applied to one or both sides of the anode current collector 11. In one embodiment, the cathode 20 comprises LMO active material 23 and AC capacitor material 22 applied to one or both sides of the cathode current collector 21, and the anode 10 comprises LTO host material 13 applied to one or both sides of the anode current collector 11. In one embodiment, the cathode 20 comprises NMC active material 23 and AC capacitor material 22 applied to one or both sides of the cathode current collector 21, and the anode 10 comprises LTO host material 13 applied to one or both sides of the anode current collector 11. In one embodiment, the cathode 20 comprises LFP active material 23 and AC capacitor material 22 applied to one or both sides of the cathode current collector 21, and the anode 10 comprises graphite and silicon or silicon oxide host material 13 applied to one or both sides of the anode current collector 11. In one embodiment, the cathode 20 comprises NMC active material 23 and AC capacitor material 22 applied to one or both sides of the cathode current collector 21, and the anode 10 comprises graphite and silicon or silicon oxide host material 13 host material 13 applied to one or both sides of the anode current collector 11.

Anode host material 13, cathode active material 23, and capacitor material 12 and/or 22 can further include a polymer binder material to adhere each material to its appurtenant current collector. Suitable polymer binder materials include one or more of polyvinylidene fluoride (PVdF), an ethylene propylene diene monomer (EPDM) rubber, carboxymethoxyl cellulose (CMC), and styrene, 1,3-butadiene polymer (SBR), or polytetrafluoroethylene (PTFE). The binders are ideally not electrically conducive and should be used in a minimal suitable amount to obtain a durable coating of porous electrode material without fully covering the surfaces of the particles of materials.

Any appropriate electrolyte solution that can conduct lithium ions between Anode 10 and cathode 20 can be used in hybrid cell 10. In one embodiment, the electrolyte solution can be a non-aqueous liquid electrolyte solution that includes a lithium salt dissolved in an organic solvent or a mixture of organic solvents. A non-limiting list of lithium salts that can be dissolved in an organic solvent to form the non-aqueous liquid electrolyte solution include LiClO4, LiAlCl4, LiI, LiBr, LiSCN, LiBF4, LiB(C6H5)4 LiAsF6, LiCF3SO3, LiN(CF3SO2)2, LiPF6, and mixtures thereof. These and other similar lithium salts can be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof. Polymer electrolytes 3 can include one or more polymers, such as polyethyleneoxide (PEO) or polyacrylonitrile, among others, and one or more lithium salts, such as LiPF6, LiBF4, LiClO4, LiSICON, or LiPON, among others.

The separator 2 is used to prevent direct electrical contact between the anode 10 and cathode 20, and is shaped and sized to serve this function. In the assembly of the hybrid electrochemical cell 1, the two electrodes are pressed against opposite sides of the separator 3, and an electrolyte 3 is disposed therebetween. For example, a liquid electrolyte 3 can be injected into the pores of the separator 2 and electrode material layers. The microporous polymer separator 2 can comprise, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume any copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. Separator 2 can optionally be ceramic-coated with materials including one or more of ceramic type aluminum oxide (e.g., $Al_2O_3$), and lithiated zeolite-type oxides, among others. Lithiated zeolite-type oxides can enhance the safety and cycle life performance of lithium ion batteries, such as hybrid cell 10.

The microporous polymer separator 2 may be a single layer or a multi-layer laminate fabricated from either a dry or wet process. For example, in one embodiment, a single layer of the polyolefin may constitute the entirety of the microporous polymer separator 2. As another example, however, multiple discrete layers of similar or dissimilar polyolefins may be assembled into the microporous polymer separator 2. The microporous polymer separator 2 may also comprise other polymers in addition to the polyolefin such as, but not limited to, polyethylene terephthalate (PET), polyvinylidene fluoride (PVdF), and or a polyamide (Nylon). The polyolefin layer, and any other optional polymer layers, may further be included in the microporous polymer separator 2 as a fibrous layer to help provide the microporous polymer separator 2 with appropriate structural and porosity characteristics. Skilled artisans will undoubtedly know and understand the many available polymers and commercial products from which the microporous polymer separator 2 may be fabricated, as well as the many manufacturing methods that may be employed to produce the microporous polymer separator 2.

Host material 13, active material 23, and capacitor material 12 and/or 22 can be applied to one or more electrodes of a hybrid cell in varying amounts and geometries in order to achieve desired characteristics. Generally, host material 13, active material 23, and capacitor material 12 and/or 22 can be applied to each of both sides of one or more electrodes in thicknesses of about 20 μm to about 200 μm, although other thicknesses are practicable. The hybrid electrodes (e.g., anode 10 and cathode 20) can be utilized in various cell configurations including prismatic/stacked, and wound (e.g., cylindrical or pouch). For a given hybrid electrode, the anode region(s) or cathode region(s) and the capacitor region(s) can be arranged as alternating strips, as shown in the FIGS. 2A, 3A, 4A-4D, and 5A-5D. In some embodiments, an anode region or a cathode region can have a width of about 25 millimeters to about 500 millimeters, and a capacitor region can have a width of about 5 millimeters to about 400 millimeters.

Figure 2A:
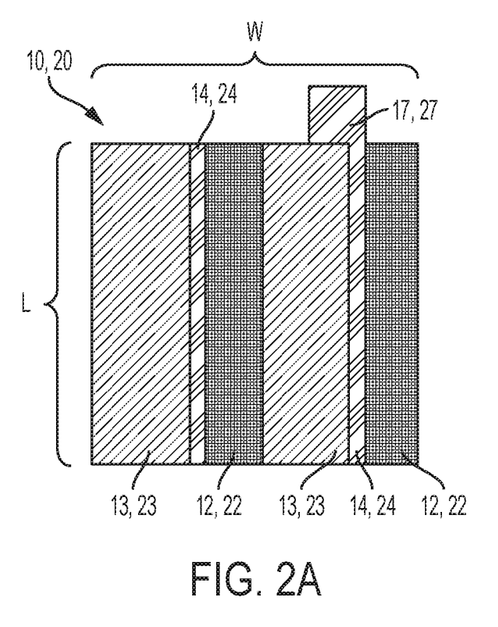
FIG. 2A illustrates a schematic view of a hybrid electrode, according to one or more embodiments.
Figure 2B:
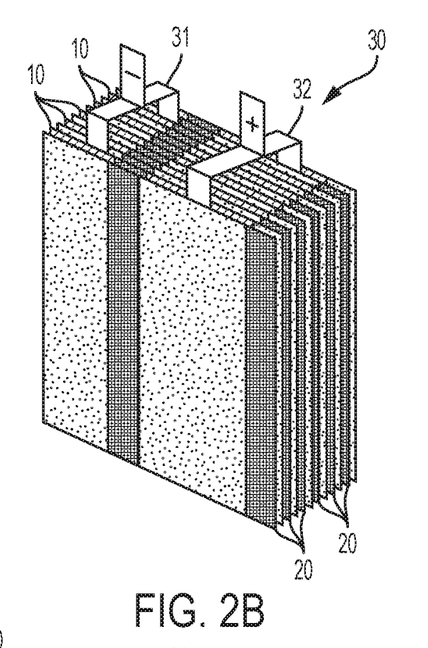
FIG. 2B illustrates a perspective view of a prismatic hybrid electrochemical module, according to one or more embodiments.
Figure 3A:
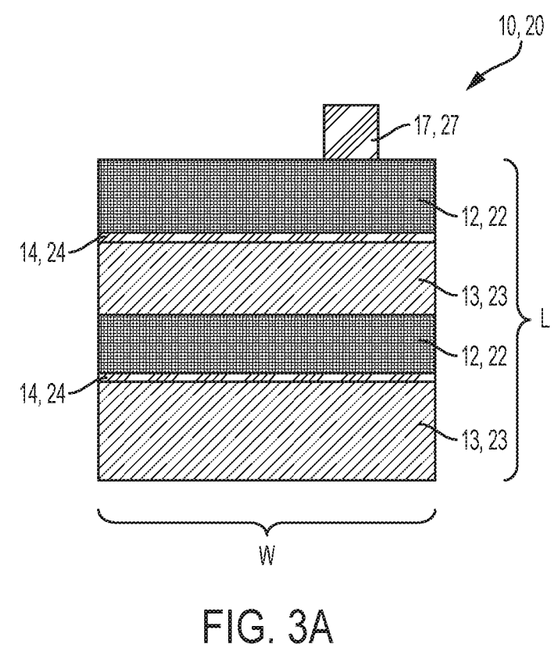
FIG. 3A illustrates a schematic view of a hybrid electrode, according to one or more embodiments.
Figure 3B:
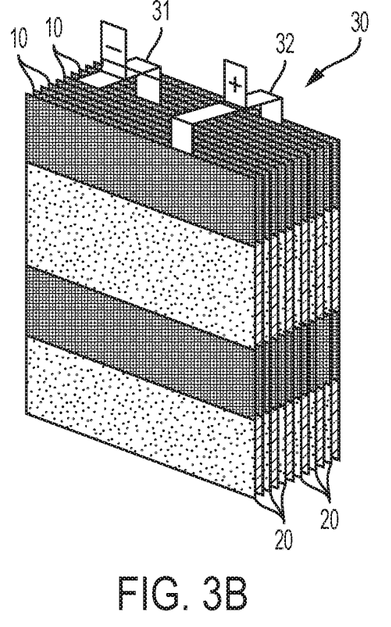
FIG. 3B illustrates a perspective view of a prismatic hybrid electrochemical module, according to one or more embodiments.

FIGS. 2A and 3A illustrates a schematic view of a hybrid electrode (i.e., anode 10 or cathode 20) characterized by a length L and a width W and comprising one or more capacitor regions in which capacitor material 12, 22 is applied to the current collector 11, 21. The remaining portions of the current collector 11, 21 comprise host material 13 or active material 23 applied in anode regions or cathode regions, respectively. The electrode 10, 20 can optionally include gaps 14, 24 between the anode region(s) or cathode region(s) and the capacitor region(s) of the current collector 11 or 21. Gaps can comprise a width (measured between the anode region or cathode region and the capacitor region) of about 0.01 to about 5 mm, in some embodiments. An electrode tab 17, 27 extends lengthwise from the current collector 11, 21. The electrode 10, 20 of FIG. 2A comprises anode regions or cathode regions and capacitor regions which extend lengthwise across the electrode, whereas the electrode 10, 20 of FIG. 3A comprises anode regions or cathode regions and capacitor regions which extend widthwise across the electrode. FIG. 2B illustrates a perspective view of a prismatic hybrid electrochemical module 30 comprising a plurality of the electrodes 10, 20 illustrated in FIG. 2A, and FIG. 3B illustrates a perspective view of a prismatic hybrid electrochemical module 30 comprising a plurality of the electrodes 10, 20 illustrated in FIG. 3A. In each of FIGS. 2B and 3B, the electrodes are stacked by alternating anodes 10 and cathodes 20. The separators 2, electrolyte 3, and other appurtenant components of such hybrid electrochemical cells are omitted for clarity. An anode busbar 31 electrically connects the electrode tabs 17 of one or more anodes 10, and a cathode busbar 32 electrically connects the electrode tabs 27 of one or more cathodes 20.

Figure 4A:
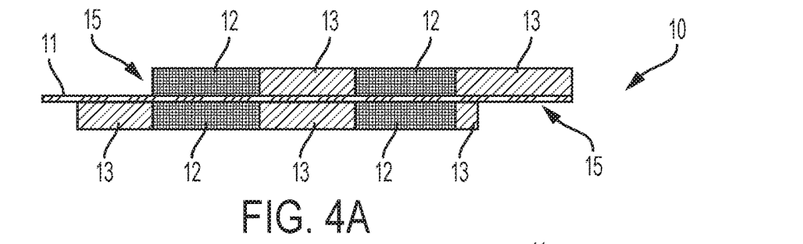
FIG. 4A illustrates a side view of a hybrid anode, according to one or more embodiments.
Figure 4B:
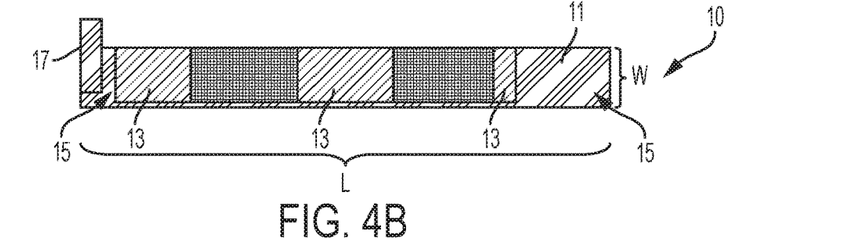
FIG. 4B illustrates a top view of a hybrid anode, according to one or more embodiments.
Figure 5A:
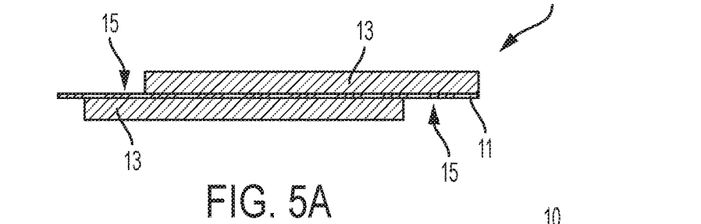
FIG. 5A illustrates a side view of a hybrid anode, according to one or more embodiments.
Figure 5B:
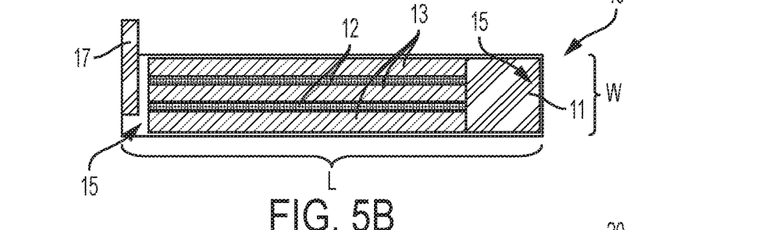
FIG. 5B illustrates a top view of a hybrid anode, according to one or more embodiments.

FIGS. 4A and 4B illustrate a side view and a top view, respectively, of a hybrid anode 10. FIGS. 5A and 5B similarly illustrate a side view and a top view, respectively, of a hybrid anode 10. The anodes 10 are characterized by a length L and a width W and comprise one or more capacitor regions in which capacitor material 12 is applied to the current collector 11. The remaining portions of the current collector 11 comprise host material 13 applied in one or more anode regions. The anodes 10 can optionally include gaps (not shown) between the anode region(s) and the capacitor region(s) of the current collector 11. An electrode tab 17 extends lengthwise from the current collector 11. The anode 10 of FIGS. 4A-B comprises one or more anode regions and one or more capacitor regions which extend widthwise across the anode 10, whereas the anode 10 of FIGS. 5A-B comprises one or more anode regions and one or more capacitor regions which extend lengthwise across the anode 10.

Figure 4C:
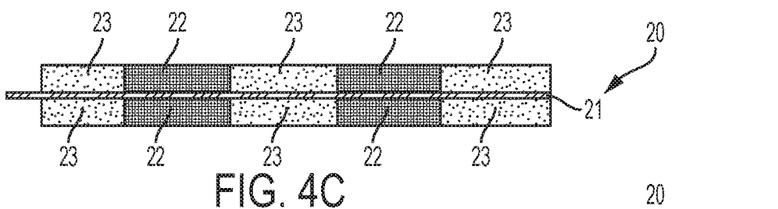
FIG. 4C illustrates a side view of a hybrid cathode, according to one or more embodiments.
Figure 4D:
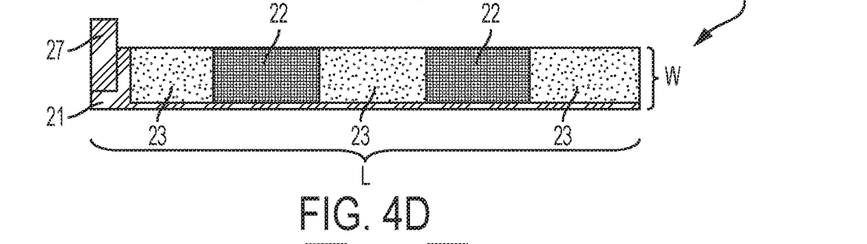
FIG. 4D illustrates a top view of a hybrid cathode, according to one or more embodiments.
Figure 5C:
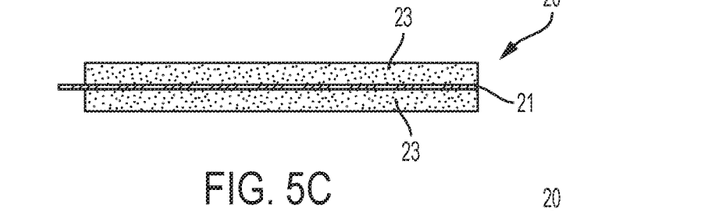
FIG. 5C illustrates a side view of a hybrid cathode, according to one or more embodiments.
Figure 5D:
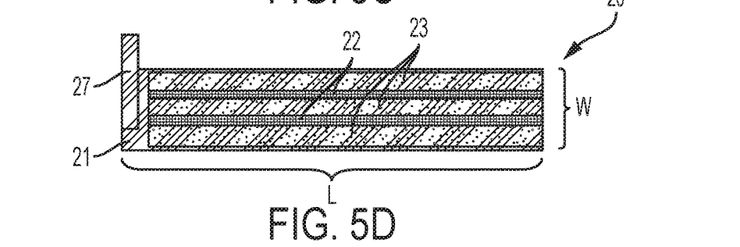
FIG. 5D illustrates a top view of a hybrid cathode, according to one or more embodiments.

FIGS. 4C and 4D illustrate a side view and a top view, respectively, of a hybrid cathode 20 which may be suitability utilized in combination with the anode 10 of FIGS. 4A-B to form a hybrid electrochemical cell 1. FIGS. 5C and 5D similarly illustrate a side view and a top view, respectively, of a hybrid cathode 20 which may be suitability utilized in combination with the anode 10 of FIGS. 5A-B to form a hybrid electrochemical cell 1. The cathodes 20 are characterized by a length L and a width W and comprise one or more capacitor regions in which capacitor material 22 is applied to the current collector 21. The remaining portions of the current collector 21 comprise active material 23 applied in one or more cathode regions. The cathodes 20 can optionally include gaps (not shown) between the cathode region(s) and the capacitor region(s) of the current collector 21. An electrode tab 27 extends lengthwise from the current collector 21. The cathode 20 of FIGS. 4C-D comprises one or more cathode regions and one or more capacitor regions which extend widthwise across the cathode 20, whereas the cathode 20 of FIGS. 5C-D comprises one or more cathode regions and one or more capacitor regions which extend lengthwise across the cathode 20.

Figure 4E:
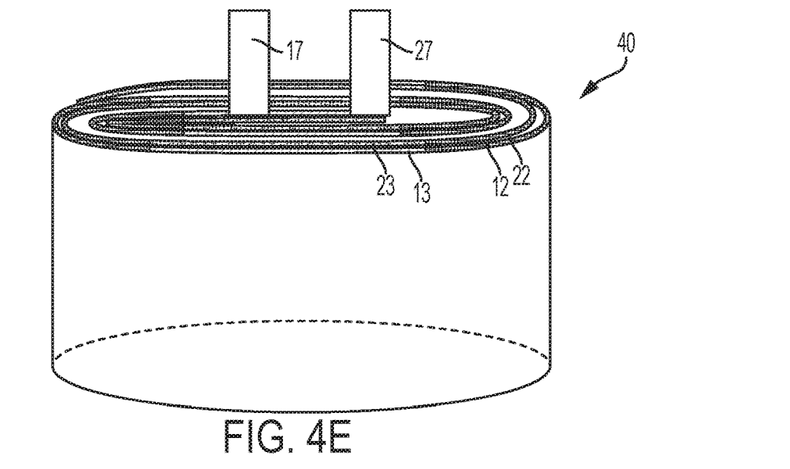
FIG. 4E illustrates a perspective view of a wound hybrid electrochemical module, according to one or more embodiments.
Figure 5E:
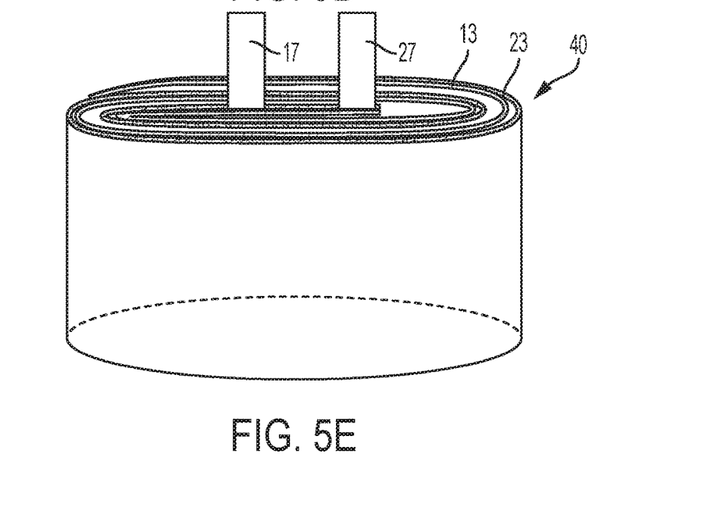
FIG. 5E illustrates a perspective view of a wound hybrid electrochemical module, according to one or more embodiments.

FIG. 4E illustrates a perspective view of a wound hybrid electrochemical module 40 comprising one or a plurality of electrode pairs formed from the anode 10 and cathode 20 illustrated in FIGS. 4A-D, and FIG. 5E illustrates a perspective view of a wound hybrid electrochemical module 40 comprising one or a plurality of electrode pairs formed from the anode 10 and cathode 20 illustrated in FIGS. 5A-D. The wound hybrid electrochemical module 40 in each of FIGS. 4E and 5E are shown comprising a single pair of electrodes (i.e., anode 10 and cathode 20), but each module 40 may comprise a plurality of electrode pairs. The separators 2, electrolyte 3, and other appurtenant components of such hybrid electrochemical cells are omitted for clarity. Host material 13 coating gaps 15 can optionally occur at the lengthwise ends of anodes 10 in order to facilitate winding of the electrodes 10, 20 to form the wound hybrid electrochemical module 40.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A hybrid electrochemical cell comprising:
an anode having an anode current collector with two anode sides, wherein:
  each of the two anode sides is coated in one or more anode regions with an anode host material and in one or more first capacitor regions with a first capacitor material;
  the one or more anode regions and the one or more first capacitor regions define one or more anode gaps between the anode host material and the first capacitor material; and
  the one or more anode gaps each has a width of about 0.01 millimeters to about 5 millimeters; and
a cathode having a cathode current collector with two cathode sides, wherein:

each of the two cathode sides is coated in one or more cathode regions with a cathode active material and in one or more second capacitor regions with a second capacitor material;

the one or more cathode regions and the one or more second capacitor regions define one or more cathode gaps between the cathode active material and the second capacitor material; and the one or more cathode gaps each has the width of about 0.01 millimeters to about 5 millimeters.

2. The hybrid electrochemical cell of claim 1, wherein:
the one or more first capacitor regions of the anode are distinct from and do not overlap the one or more anode regions; and
the one or more second capacitor regions of the cathode are distinct from and do not overlap the one or more cathode regions.

3. The hybrid electrochemical cell of claim 1, wherein the first capacitor material and/or the second capacitor material comprises one or more of activated carbon, graphite, carbon aerogel, carbide-derived carbon, graphene, graphene oxide, carbon nanotubes, lead oxide, germanium oxide, cobalt oxide, nickel oxide, copper oxide, iron oxide, manganese oxide, ruthenium oxide, rhodium oxide, palladium oxide, chromium oxide, molybdenum oxide, tungsten oxide, niobium oxide, $TiS_2$, NiS, $Ag_4Hf_3S_8$, CuS, FeS, and $FeS_2$.

4. The hybrid electrochemical cell of claim 3, wherein:
the first capacitor material applied to the anode current collector is different from the anode host material; and
the second capacitor material applied to the cathode current collector is different from the cathode active material.

5. The hybrid electrochemical cell of claim 1, wherein the anode host material comprises one or more of lithium titanate, $TiNb_2O_7$, silicon, one or more silicon-lithium alloys, one or more silicon-tin alloys, one or more silicon-copper alloys, one or more silicon oxides, one or more cobalt oxides, one or more iron oxides, one or more titanium oxides, tin, one or more tin oxides, hard carbon, soft carbon, and graphite.

6. The hybrid electrochemical cell of claim 1, wherein the cathode active material comprises one or more lithium metal oxides.

7. The hybrid electrochemical cell of claim 1, wherein:
the cathode active material comprises one or more of lithium iron phosphate, lithium nickel-manganese-cobalt oxide, and spinel-structured lithium manganese oxide;
the anode host material comprises one or more of graphite, silicon, and one or more silicon oxides; and
the first capacitor material and/or the second capacitor material comprises activated carbon.

8. A hybrid electrochemical cell comprising:
an anode having an anode current collector with two anode sides, wherein:
each of the two anode sides is coated in a plurality of anode regions with an anode host material and in one or more first capacitor regions with a first capacitor material;
a first anode end of the anode includes a first anode region of the plurality of anode regions;
a first anode side of the anode current collector in the first anode region is partially coated with the anode host material;
a second anode side of the anode current collector in the first anode region is uncoated;
a second anode end of the anode includes a second anode region of the plurality of anode regions;
the first anode side of the anode current collector in the second anode region is partially coated with the anode host material;
the second anode side of the anode current collector in the second anode region is fully coated with the anode host material;
the first anode region and the second anode region are on opposite sides of the anode current collector;
the plurality of anode regions and the one or more first capacitor regions define a plurality of anode gaps between the anode host material and the first capacitor material; and
the plurality of anode gaps each have a width of about 0.01 millimeters to about 5 millimeters;
an anode electrode tab directly connected to the first anode side of the anode current collector within the first anode region;
a cathode having a cathode current collector with two cathode sides, wherein:
each of the two cathode sides of the cathode current collector is coated in a plurality of cathode regions with a cathode active material and in one or more second capacitor regions with a second capacitor material;
a first cathode end of the cathode includes a first cathode region of the plurality of cathode regions;
each of the two cathode sides of the cathode current collector in the first cathode region is partially uncoated;
a second cathode end of the cathode includes a second cathode region of the plurality of cathode regions;
each of the two cathode sides of the cathode current collector in the second cathode region is fully coated with the cathode active material;
the first cathode region is aligned with the first anode region;
the plurality of cathode regions and the one or more second capacitor regions define a plurality of cathode gaps between the cathode active material and the second capacitor material; and
the plurality of cathode gaps each have the width of about 0.01 millimeters to about 5 millimeters; and
a cathode electrode tab directly connected to the cathode current collector within the first cathode region.

9. The hybrid electrochemical cell of claim 8, wherein the first capacitor material and/or the second capacitor material comprises one or more of activated carbon, graphite, carbon aerogel, carbide-derived carbon, graphene, graphene oxide, carbon nanotubes, lead oxide, germanium oxide, cobalt oxide, nickel oxide, copper oxide, iron oxide, manganese oxide, ruthenium oxide, rhodium oxide, palladium oxide, chromium oxide, molybdenum oxide, tungsten oxide, niobium oxide, $TiS_2$, NiS, $Ag_4Hf_3S_8$, CuS, FeS, $FeS_2$, poly (3-methyl thiophene), polyaniline, polypyrrole, poly(paraphenylene), polyacene, polythiophene, and polyacetylene.

10. The hybrid electrochemical cell of claim 8, wherein:
the cathode active material comprises one or more of lithium iron phosphate, lithium nickel-manganese-cobalt oxide, and spinel-structured lithium manganese oxide;
the anode host material comprises one or more of graphite, silicon, and one or more silicon oxides; and
the first capacitor material and/or the second capacitor material comprises activated carbon.

11. The hybrid electrochemical cell of claim 8, wherein the anode host material comprises one or more of lithium titanate, TiNb$_2$O$_7$, silicon, one or more silicon-lithium alloys, one or more silicon-tin alloys, one or more silicon-copper alloys, one or more silicon oxides, one or more cobalt oxides, one or more iron oxides, one or more titanium oxides, tin, one or more tin oxides, hard carbon, soft carbon, and graphite.

12. The hybrid electrochemical cell of claim 8, wherein the cathode active material comprises one or more lithium metal oxides.

13. A hybrid electrochemical module comprising:
a plurality of stacked or wound electrode pairs, each electrode pair comprising:
an anode having an anode current collector with two sides, wherein:
   each side of the two sides is coated in one or more anode regions with an anode host material and in one or more first capacitor regions with a first capacitor material;
   the one or more anode regions and the one or more first capacitor regions define one or more anode gaps between the anode host material and the first capacitor material; and
   the one or more anode gaps each has a width of about 0.01 millimeters to about 5 millimeters; and
a cathode having a cathode current collector with two cathode sides, wherein:
   each of the two sides is coated in one or more cathode regions with a cathode active material and in one or more second capacitor regions with a second capacitor material;
   the one or more cathode regions and the one or more second capacitor regions define one or more cathode gaps between the cathode active material and the second capacitor material; and
   the one or more cathode gaps each has the width of about 0.01 millimeters to about 5 millimeters.

14. The hybrid electrochemical module of claim 13, wherein
the first capacitor material and/or the second capacitor material comprises one or more of activated carbon, graphite, carbon aerogel, carbide-derived carbon, graphene, graphene oxide, carbon nanotubes, lead oxide, germanium oxide, cobalt oxide, nickel oxide, copper oxide, iron oxide, manganese oxide, ruthenium oxide, rhodium oxide, palladium oxide, chromium oxide, molybdenum oxide, tungsten oxide, niobium oxide, TiS$_2$, NiS, Ag$_4$Hf$_3$S$_8$, CuS, FeS, and FeS$_2$.

15. The hybrid electrochemical module of claim 13, wherein
a thickness of the first capacitor material, the second capacitor material, the anode host material, and the cathode active material is about 20 micrometers to about 200 micrometers.

16. The hybrid electrochemical module of claim 13, wherein:
a first width of the one or more anode regions and/or the one or more cathode regions is about 25 millimeters to about 500 millimeters; and
a second width of the one or more capacitor regions is about 5 millimeters to about 400 millimeters.

17. The hybrid electrochemical module of claim 13, wherein:
the cathode active material comprises one or more of lithium iron phosphate, lithium nickel-manganese-cobalt oxide, and spinel-structured lithium manganese oxide;
the anode host material comprises one or more of graphite, silicon, and one or more silicon oxides; and
the first capacitor material and/or the second capacitor material comprises activated carbon.

18. The hybrid electrochemical cell of claim 1, wherein
a thickness of the first capacitor material, the second capacitor material, the anode host material, and the cathode active material is about 20 micrometers to about 200 micrometers.

19. The hybrid electrochemical module of claim 13, wherein
the anode host material comprises one or more of lithium titanate, TiNb2O7, silicon, one or more silicon-lithium alloys, one or more silicon-tin alloys, one or more silicon-copper alloys, one or more silicon oxides, one or more cobalt oxides, one or more iron oxides, one or more titanium oxides, tin, one or more tin oxides, hard carbon, soft carbon, and graphite.

20. The hybrid electrochemical module of claim 13, wherein
the cathode active material comprises one or more lithium metal oxides.

* * * * *